United States Patent
Gehrig et al.

(10) Patent No.: US 8,991,805 B2
(45) Date of Patent: Mar. 31, 2015

(54) LENS-HOLDER WITH OFFSET HOOK

(75) Inventors: Jean Gehrig, Viry (FR); Denis Gehrig, Saint-Julien en Genevois (FR)

(73) Assignee: SCL International Special Coating Laboratory (FR)

( * ) Notice: Subject to any disclaimer, the term of this patent is extended or adjusted under 35 U.S.C. 154(b) by 53 days.

(21) Appl. No.: 13/989,163

(22) PCT Filed: Nov. 22, 2011

(86) PCT No.: PCT/FR2011/052726
§ 371 (c)(1),
(2), (4) Date: May 23, 2013

(87) PCT Pub. No.: WO2012/069757
PCT Pub. Date: May 31, 2012

(65) Prior Publication Data
US 2013/0242418 A1    Sep. 19, 2013

(30) Foreign Application Priority Data

Nov. 25, 2010  (FR) .................................... 10 59715

(51) Int. Cl.
| | | |
|---|---|---|
| *B25B 1/02* | (2006.01) | |
| *G02B 7/02* | (2006.01) | |
| *B05C 13/02* | (2006.01) | |
| *B08B 11/02* | (2006.01) | |
| *B29D 11/00* | (2006.01) | |
| *B05C 3/09* | (2006.01) | |

(52) U.S. Cl.
CPC . *G02B 7/02* (2013.01); *B05C 13/02* (2013.01); *B08B 11/02* (2013.01); *B29D 11/00432* (2013.01); *B05C 3/09* (2013.01)
USPC .......................................... 269/143; 359/818

(58) Field of Classification Search
CPC ............ G02B 7/02; B05C 13/02; B05C 3/09; B08B 11/02; B29D 11/00432
USPC .................... 359/811, 818, 819; 269/143, 249
See application file for complete search history.

(56) References Cited

U.S. PATENT DOCUMENTS

2010/0275839 A1* 11/2010 Velasquez et al. ............ 118/503

FOREIGN PATENT DOCUMENTS

| EP | 0215261 A2 | 3/1987 |
|---|---|---|
| EP | 1428585 A1 | 6/2004 |
| EP | 1547696 A1 | 6/2005 |
| JP | 2010-020138 A | 1/2010 |

OTHER PUBLICATIONS

International Search Report issued Jun. 26, 2012 re: PCT/FR2011/052726; citing: EP 1 547 696 A1, EP 0 215 261 A2 and JP 2010-020138 A.

* cited by examiner

*Primary Examiner* — William Choi
(74) *Attorney, Agent, or Firm* — Cantor Colburn LLP

(57) ABSTRACT

The subject of the present invention is a lens-holder device (1) intended to be hooked onto a support (101) of determined direction belonging to a conveyor carriage intended for transporting optical lenses (10) so that an optical test can be carried out on said optical lenses following a treatment of said optical lenses, said lens-holder device (1) comprising a body (2), suspension means (3) for suspending from the support (101) which are connected to the body (2), retaining the means (4) for keeping an optical lens (10) in position on the lens-holder device (1), which are connected to the body (2), these retaining means (4) comprising support means (5) defining at least one first resting point (a) for the optical lens (10), elastic return means (6) defining at least two further resting points (b, c) for the optical lens (10), the various resting points (a, b, c) defining a location for the optical lens (10), the body of the lens-holder device (1) being shaped in such a way as to pass around the portions of space that are situated facing the location occupied by the optical lens (10).

9 Claims, 3 Drawing Sheets

LENS-HOLDER WITH OFFSET HOOK

TECHNICAL FIELD

The present invention relates to a lens-holder device more particularly designed for the analysis of optical lenses.

BACKGROUND

A lens-holder device may typically be hooked to a holder of a conveyor carriage of an analysis machine, said conveyor carriage being designed to transport optical lenses so that an optical test can be carried out on said optical lenses following a treatment of said optical lenses.

These treatments may be of various types, for example such as chemical strengthening, thermal strengthening or treatments providing abrasion resistance, anti-scratch-treatments, antireflective treatments, anti-soiling treatments, ultraviolet treatments, or tinting treatments.

The analyses done may also be of several types, in particular reflection, transmission, or grazing incidence light.

To be able to perform these analyses, it is preferable to keep a same location for an optical lens over time and for optical lenses of different weights so as to preserve the measuring adjustments.

It is known from document EP1428585B1 to have a lens-holder including a support, said lens-holder device including a body to which suspension means for suspending from the support are connected, and means for keeping the optical lens in a determined location.

However, this lens-holder device, through the configuration of its body, does not make it possible to perform transmission and grazing incidence light analysis.

BRIEF SUMMARY

The present invention aims to resolve all or some of the aforementioned drawbacks.

To that end, the present invention relates to a lens-holder device intended to be hooked onto a support in a determined direction belonging to a conveyor carriage intended for transporting optical lenses, said lens-holder device comprising a body, suspension elements for suspending from the support which are connected to the body, retaining parts for keeping an optical lens in position on the lens-holder device, which are connected to the body, these retaining parts comprising support portions defining at least one first resting point for the optical lens, elastic return elements defining at least two further resting points for the optical lens, the various resting points defining a location for the optical lens, the body of the lens-holder device being shaped in such a way as to pass around the portions of space that are situated facing the location occupied by the optical lens.

This arrangement makes it possible to perform transmission, reflection or grazing incidence light optical analyses without any hindrance from the body of the lens-holder device.

It must of course be understood that the term "facing the location" designates a portion of the space, when the optical lens is positioned on its location, defined by the set of straight lines passing through the two main bases for optics of the optical lens and substantially perpendicular to a plane in which the location of the optical lens fits.

According to one embodiment, the body is rigid.

This arrangement makes it possible to keep the same location for the optical lens over time, for optical lenses with different weights and without hindrance from the body of the lens-holder device so as in particular to preserve the measuring adjustments for the optical analyses done, whether they are transmission, reflection or grazing incidence light analyses.

According to one embodiment, the support portions are stationary relative to the suspension elements.

According to one embodiment, the position of the first resting point for the optical lens defined by the support portions is stationary in the location of the optical lens, and independent from the intrinsic characteristics of the optical lens.

According to one embodiment, the position of the other two resting points for the optical lens defined by the elastic return elements depends on the intrinsic characteristics of the optical lens.

According to one embodiment, the body comprises a connecting part between the at least one first resting point and the suspension elements that extends over the periphery of the maintaining location of the optical lens in a same plane as that in which the location of the optical lens extends.

This arrangement makes it possible to place the body of the lens-holder device in the most suitable location to allow measurements of an analysis with a reduced bulk of the lens-holder device.

According to one embodiment, the plane in which the location of the optical lens extends is substantially transverse to the direction assumed by the support on which it is hooked.

This arrangement makes it possible to perform measurements on optical lenses with varying thicknesses.

According to one embodiment, the support portions include a stop extending in a substantially longitudinal plane with respect to the direction assumed by the support on which it is hooked.

According to one embodiment, the stop is generally cup-shaped.

This arrangement makes it possible to impart stability to an optical lens supported by the stop.

According to one embodiment, the body has a counterweight designed to orient, substantially vertically, a plane transverse to the direction of the support and in which at least the first resting point and the suspension elements of the lens-holder device fit.

This arrangement makes it possible to preserve a relatively constant alignment position for the analysis device apparatuses despite the use of thicker and therefore heavier optical lenses.

According to one embodiment, the support portions are connected to the body by an assembly of the tenon-mortise type.

The present invention also relates to a conveyor carriage designed to transport optical lenses so as to perform an optical test on said optical lenses following a treatment of said optical lenses including a lens-holder device as previously described.

The present invention also relates to a treatment machine including such a conveyor carriage.

BRIEF DESCRIPTION OF THE DRAWINGS

In any event, the invention will be well understood using the following description, in reference to the appended diagrammatic drawing showing, as a non-limiting example, a lens-holder device according to the invention.

DETAILED DESCRIPTION

Figure 1:
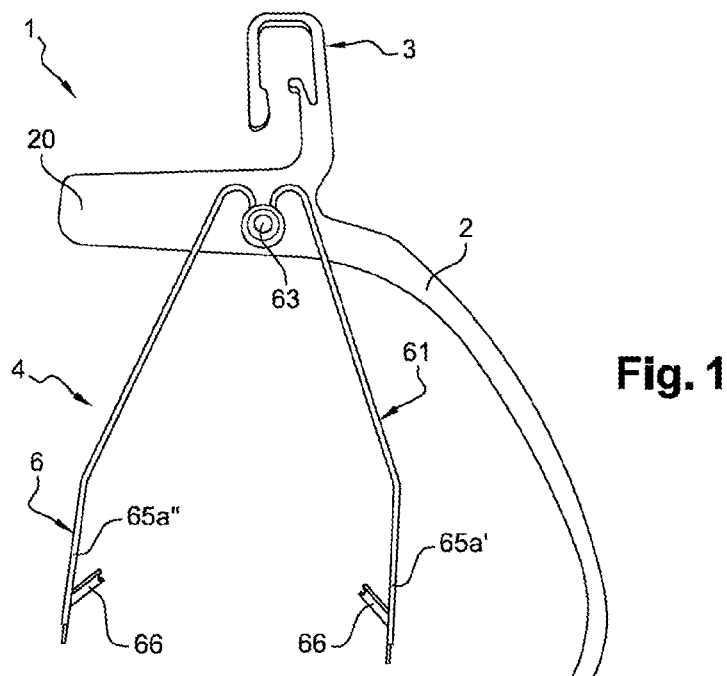
FIG. 1 shows a general perspective view of one embodiment of a lens-holder device according to the invention.
Figure 2:
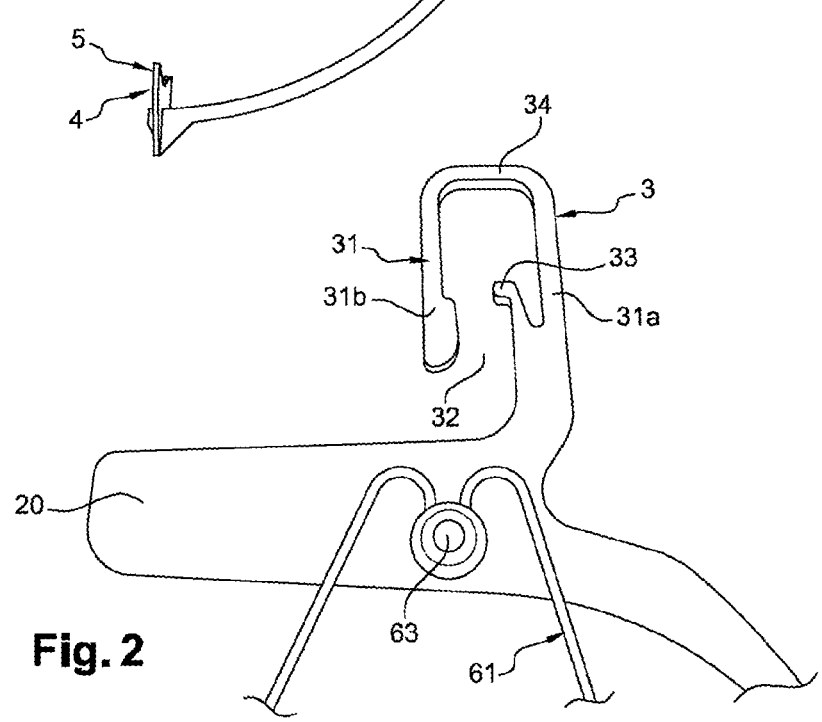
FIG. 2 shows a detailed view of a first part of the device of FIG. 1.
Figure 3:
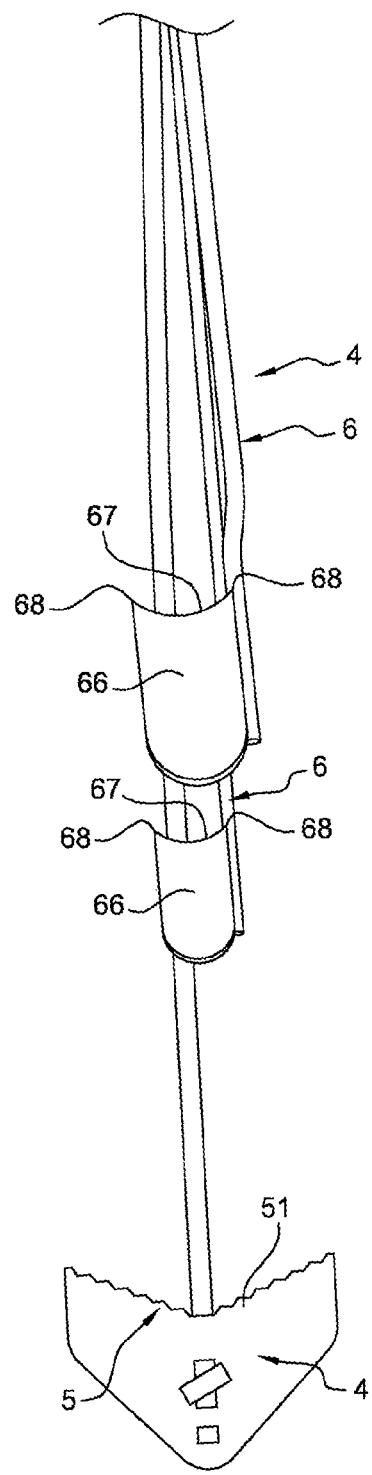
FIG. 3 shows a detailed profile view of part of the device of FIG. 1.
Figure 4:
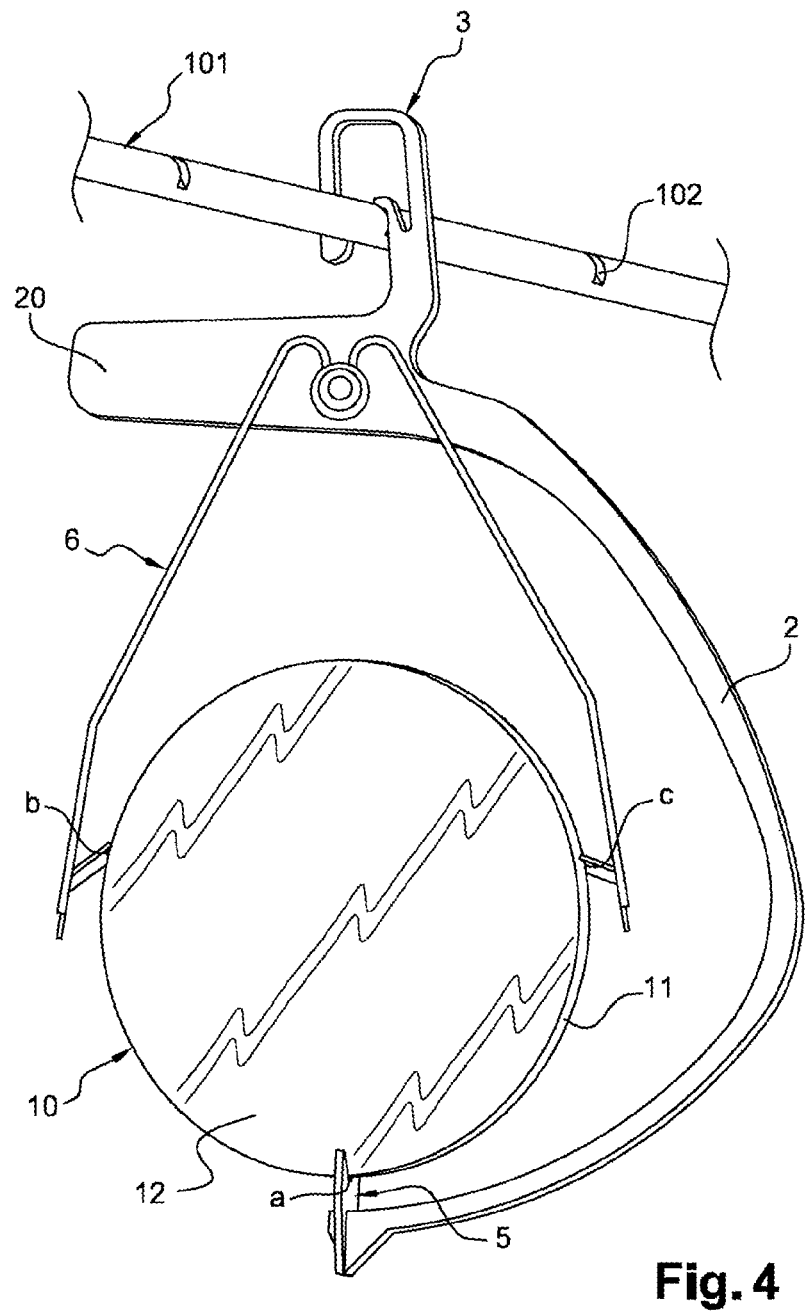
FIG. 4 shows a detailed perspective view of the device of FIG. 1 holding a lens.

As illustrated in FIG. 1, a lens-holder device 1 according to one embodiment of the invention includes a body 2, also called a hook, to which suspension elements 3 are connected for the lens-holder device 1, in particular to a support 101 embodied by a rectilinear chassis bar 101 of the conveyor carriage, and retaining parts 4 for keeping the optical lens 10 in position.

The body 2 is rigid and does not deform under the action of the weight of an optical lens 10.

The suspension elements 3 of a lens-holder device 1 are connected to a first end of the body 2 and form a catch in the shape of an upside down U including two branches 31a, 31b and an opening 32.

The opening 32 created between the branches 31a, 31b of the catch 31 is designed to receive the chassis bar 101 of a conveyor carriage that is gripped between part of the branches 31a, 31b, one of which 31a has a rectilinear profile that is engaged in a notch 102 whereof the bottom is also rectilinear, the blocking by shape matching done by the contact between the two rectilinear faces of the branch 31a and the bottom of the notch 102, respectively, resulting in preventing the body 2 from rotating freely around the bar 101 and falling, in particular upon movement of the conveyor carriage during an analysis.

Furthermore, the branch 31a has a stop 33 making it possible to limit the insertion of the lens-holder device 1 on the chassis bar 101 so as to make the two rectilinear faces of the branch 31a and the bottom of the notch 102 match.

These suspension elements 3 are made in a single piece with the body 2 along a plane with the same orientation as the notch 102, and more particularly in the embodiment shown in a plane oriented substantially longitudinally to a general plane of the body 2.

The suspension elements 3 also comprise gripping portions 34 in the shape of an upside down U, and defined by the stop 33, making it possible to grip the lens-holder device 1 so as to suspend it on or remove it from the chassis bar 101.

The lens-holder device 1 can thus be assembled or disassembled easily from the chassis bar 101 by simple snapping of the catch 31 in the notch 102, and it is then possible to perform verifications of the optical lens 10 without touching it directly with the fingers by removing the corresponding lens-holder device 1 from the chassis bar 101.

The retaining parts 4 for keeping the optical lens 10 in position comprise support portions 5 defining at least one first resting point a for the optical lens 10, and elastic return elements 6 defining at least two other resting points b, c for the optical lens 10.

The different resting points a, b, c press on a peripheral edge 11 of the optical lens, which also comprises two main faces 12 or optics.

The different resting points a, b, c define a location of the optical lens 10.

This location is substantially parallel to the direction assumed by the support 101 on which the lens-holder device 1 is hooked.

The support portions 5 defining the point a are stationary relative to the suspension elements 3, which is not the case for the elastic return elements 6 defining the other two resting points b, c, the position of which may vary relative to the suspension elements 3.

Thus, the position of the points b, c varies as a function of the intrinsic characteristics of the optical lens 10, such as its dimension or its weight, while the position of the point a is invariable irrespective of the optical lens 10 that is used.

The body 2 of the lens-holder device 1 is configured so as to bypass the portions of the space positioned across from the location occupied by the optical lens 10.

It must of course be understood that the term "facing the location" designates a portion of the space, when the optical lens is positioned in its location, defined by the set of straight lines passing through the two main faces 12 or optics of the optical lens 10 and substantially perpendicular to a plane in which the location of the optical lens 10 fits.

In the illustrated embodiment, this bypass is done by a connecting part of the body 2 between the at least one first resting point a and the suspension elements 3 that extends over the periphery of the maintaining location of the optical lens 10, along the same plane as that in which the location of the optical lens 10 extends.

Likewise, the body 2 comprises a counterweight 20 designed to orient, substantially vertically, a plane transverse to the direction of the support 101 and in which the at least one first resting point and the suspension elements 3 of the lens-holder device 1 fit.

This counterweight 20 is made in a single piece with the body 2 and the suspension elements 3 and is situated in the extension of the first end of the body 2 beyond a transverse plane parallel to the branch 31b of the catch 31 of the suspension elements 3.

The support portions 5 are stationary relative to the body 2 and are positioned on the second end of the body 2 opposite the first end of the body 2 on which the suspension elements 3 are positioned.

The support portions 5 of the retaining parts 4 include a stop 51 made in a single piece.

The stop 51 extends in a substantially longitudinal plane with respect to the direction assumed by the support 101 on which the lens-holder device 1 is hooked, which, in the present embodiment, coincides with a direction transverse to the plane in which the upside down U shape of the catch 31 of the suspension elements 3 extends.

The support portions 5 are fastened to the body 2 by forming an assembly of the tenon-mortise type through the adjusted insertion of two protruding portions of the end of the body 2 acting as the tenon, in two transverse slits machined through the stop 51 performing the mortise function.

The immobilization of the support portions 5 on the end of the body 2 is then done by clinching, causing a plastic deformation of one of the protruding portions of the end of the body 2 on the support portions 5.

The stop 51 has an upper contour in the form of a cup with terraced lateral edges making it possible to wedge optical lenses 10 with different thicknesses.

The elastic return elements 6 are made up of a thin metal rod 61 folded at the middle thereof so as to form two arms 61a' and 61a", respectively.

The rod 61 is positioned on one side of the body 2 of the lens-holder device 1 and extends substantially transversely to the direction assumed by the support 101 on which the lens-holder device 1 is hooked, and more specifically in the illustrated embodiment, in a longitudinal plane with respect to a plane in which the suspension elements fit 3.

The rod 61 is embedded around an axis embodied by a rivet 63 secured to the body 2 at the end thereof, connecting it to the suspension elements 3.

The two arms 61a' and 61a" formed by the rod 61 are elastically returned toward one another, which makes it possible to pinch the optical lens 10 between two free ends 65a' and 65a" of the rod 61 by means of a contact piece 66 welded on each of said free ends 65a' and 65a".

In order to offset the shift due to the fastening of the rod 61 on one side of the body 2 and therefore to return the location of the optical lens 10 onto the plane in which the body 2 extends, the rod 61 is slightly folded in the form of a baffle in the vicinity of each of said free ends 65a' and 65a", and each contact piece 66 is welded on the lateral edge of the end 65a', 65a" of the rod 61 across from the lens-holder device 1.

The contact piece 66 is a metal piece in the form of a curved blade having, at its end designed to be in contact with the optical lens 10, a curved cutout 67 making it possible to hold optical lenses 10 with variable thicknesses.

The curved cutouts 67 each show two tips 68 making it possible to hold a very thick optical lens 10 by positioning the peripheral edge 11 of the optical lens 10 in contact with the tips 68, which results, in particular after applying varnish or another liquid, in not altering the latter due to a reduced contact surface.

The thin optical lenses 10 are maintained by positioning the peripheral edge 11 between the two tips 68 of each cutout 67.

The lens-holder device 1 thus obtained makes it possible to perform reflection, transmission and grazing incidence light optical analyses on all of the two main surfaces 12 or optics of an optical lens 10.

Although the invention has been described with respect to specific example embodiments, it is of course in no way limited thereto, and on the contrary encompasses all technical equivalents of the described parts, portions or elements as well as any combinations thereof.

The invention claimed is:

1. A lens-holder device intended to be hooked onto a support in a determined direction belonging to a conveyor carriage intended for transporting optical lenses, said lens-holder device comprising:
    a body,
    suspension elements for suspending from the support which are connected to the body,
    retaining parts for keeping an optical lens in position on the lens-holder device, which are connected to the body, these retaining parts comprising:
    support portions defining at least one first resting point for the optical lens,
    elastic return elements defining at least two further resting points for the optical lens,
    the various resting points defining a location for the optical lens,
    the body of the lens-holder device being shaped in such a way as to pass around the portions of space that are situated facing the main faces of the optical lens when the latter is positioned in its location,
    the body has a counterweight designed to orient, substantially vertically, a plane transverse to the direction of the support and in which at least the first resting point and the suspension means of the lens-holder device fit,
    the counterweight being made from a single piece with the body and the suspension means and being situated in the extension of a first end of the body beyond a transverse plane parallel to a branch of a catch of the suspension means.

2. The lens-holder device according to claim 1, wherein the body is rigid.

3. The lens-holder device according to claim 1, wherein the body comprises a connecting part between the at least one first resting point and the suspension elements that extends over the periphery of the maintaining location of the optical lens in a same plane as that in which the location of the optical lens extends.

4. The lens-holder device according to claim 3, wherein the plane in which the location of the optical lens extends is substantially transverse to the direction assumed by the support on which it is hooked.

5. The lens-holder device according to claim 3, wherein the support portions include a stop extending in a substantially longitudinal plane with respect to the direction assumed by the support on which it is hooked.

6. The lens-holder device according to claim 5, wherein the stop is generally cup-shaped.

7. The lens-holder device according to claim 1, wherein the support portions are connected to the body by an assembly of the tenon-mortise type.

8. A conveyor carriage designed to transport optical lenses so as to perform an optical test on said optical lenses following a treatment of said optical lenses including a lens-holder device according to claim 1.

9. An optical lens analysis machine including a conveyor carriage according to claim 8.

* * * * *